Oct. 5, 1954     R. W. WEEKS ET AL     2,690,890
DEICING SYSTEM FOR AIRFOIL STRUCTURES
Filed Feb. 25, 1949     2 Sheets-Sheet 1
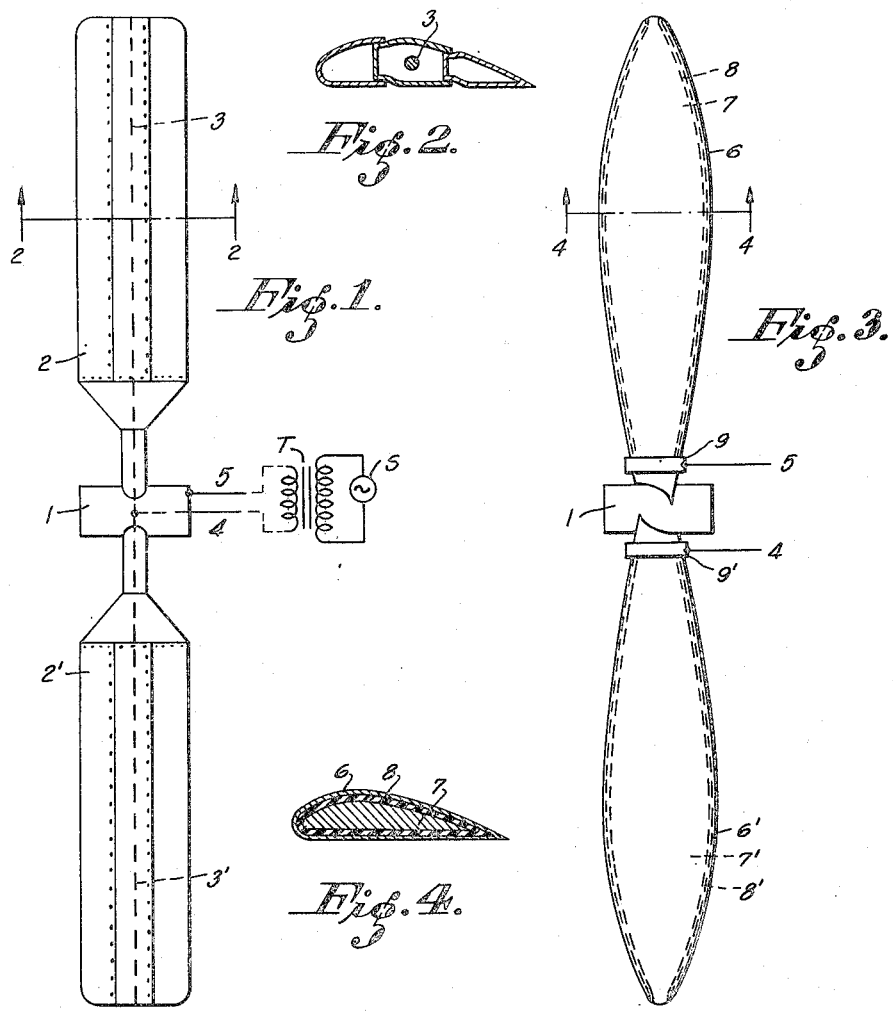
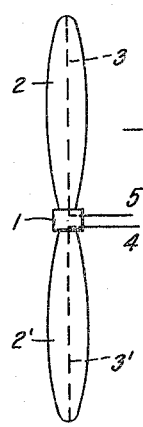
Inventor
ROBERT W. WEEKS
ALBERT C. VELDHUIS
By Ralph B. Stewart
Attorney Patented Oct. 5, 1954

2,690,890

UNITED STATES PATENT OFFICE 2,690,890

DEICING SYSTEM FOR AIRFOIL STRUCTURES

Robert W. Weeks and Albert C. Veldhuis, West Chester, Pa., assignors to Wind Turbine Company, a corporation of Pennsylvania Application February 25, 1949, Serial No. 78,314

6 Claims. (Cl. 244—134)

This invention relates to a system for preventing the formation of ice on airfoil structures such as the blades of a wind-driven motor or turbine for electric generating plant, or the propeller or wings of an aircraft. More specifically, the invention relates to a system for heating airfoil structures by passing an electrical current through a conductive layer or skin forming the outer surface of the structure.

An object of our invention is to provide a system for preventing the formation of ice on airfoil structures whereby the entire surface of the structure is heated by an electrical current and not merely a localized area.

Another object is to provide a simplified electrical de-icing system for airfoil structures wherein the current is caused to pass through the structure itself rather than through a separate heating element.

Still another object is to devise a method of concentrating the heating current in the leading edge portion of a large airfoil structure when it is desired to reduce the power required for operation.

Referring to the accompanying drawing which shows preferred embodiments of our invention:

Figure 1 is an elevation view of a propeller suitable for use with a wind-driven generator and embodying our invention;

Figure 2 is a cross-section taken along the line 2—2 of Figure 1 but shown on a slightly larger scale;

Figure 3 is an elevation view of a propeller for use in the propulsion of aircraft and embodying our invention;

Figure 4 is a cross-section taken along the line 4—4 of Figure 3;

Figure 5 is a schematic diagram showing a variation in the method of connecting the airfoil surfaces to the power source;

Figure 6:
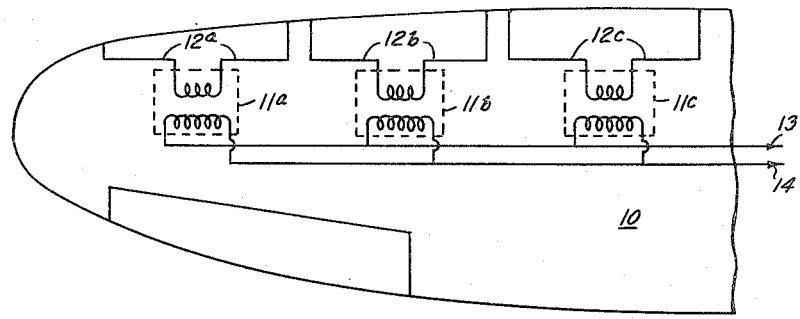
Figure 6 is a schematic diagram showing the method of connecting the surface of a large airfoil section, such as the wing of an aircraft, to the power source.

Figures 1 and 2 show a propeller of hollow blade construction such as that disclosed in Patent No. 2,008,234 to Robert W. Weeks, issued July 16, 1935, which comprises a hollow, metal hub 1 carrying hollow, metal blades 2, 2'. The outer surface of the propeller blades is formed of thin sheet metal, preferably of non-corrosive metal such as stainless steel. The blades are shown flat in Figure 1 but it will be understood that in use they are turned out of the common plane to provide the proper pitch. Disposed internally of these blades and connected to the outer tips thereof, but otherwise insulated from the propeller, are conductors 3, 3'; these conductors may be connected to a common point as in Figure 1, or they may be separated as in Figure 5. Leads 4 and 5 of low resistance are connected to a suitable power source S, such as an alternating current supply circuit including a step-down transformer T. Leads 4 and 5 may be connected to complete the circuit through the propeller blades either as shown in Figure 1 or as in Figure 5. In Figure 1 the lead 4 is connected to the common point of the conductors 3, 3', and the lead 5 is connected to the hub 1. In this arrangement the current passes through lead 4 to conductors 3, 3', along conductors 3, 3' to the tips of blades 2, 2', and through blades 2, 2' to hub 1 and lead 5. In Figure 5 lead 4 is connected to conductor 3' leading to the tip of blade 2' and the lead 5 is connected to a conductor 3 leading to the tip of the other blade 2. In this arrangement the current passes through lead 4, out conductor 3' to the tip of blade 2', along the blade 2 to the hub 1, out from the hub to the tip of blade 2, and back through conductor 3 and lead 5. In Figure 1 the blades are connected in parallel with the power source; in Figure 5 the blades are in series.

Figures 3 and 4 show a solid metal propeller such as is used in the propulsion of aircraft with thin metal outer sheaths 6, 6' separated from blades 7, 7' by thin layers of insulation 8, 8' except at the tips. The outer metal sheaths 6, 6' stop short of the hub 1 and are provided on their inner ends with relatively heavy terminal bands or cuffs 9, 9' which are insulated from the hub 1 by insulating layers 8, 8'. In the arrangement shown the current passes through conductor 4 to cuff 9', through sheath 6' to the tip of blade 7' and through metal blade 7', hub 1, and blade 7 to the sheath 6 at the tip of blade 7, through sheath 6 to cuff 9, and from there through conductor 5 back to the power source. If desired, the cuffs 9, 9' may be connected to one terminal of the power source and the hub 1 to the other terminal, thus connecting the sheaths in parallel. The layers of insulation 8, 8' may be thin coats of varnish or the like applied to the blades 7, 7'. The outer sheathing in this construction may be applied as a thin metal layer, by spraying or plating, or by any other suitable method that will provide a firmly bonded construction between the sheath, the insulation, and the blade core. Obviously, a similar construction might be employed in which the blade core is of wood and the tips of the outer sheathing are connected to conductors positioned in slots or longitudinal holes formed in the core.

Figure 7:
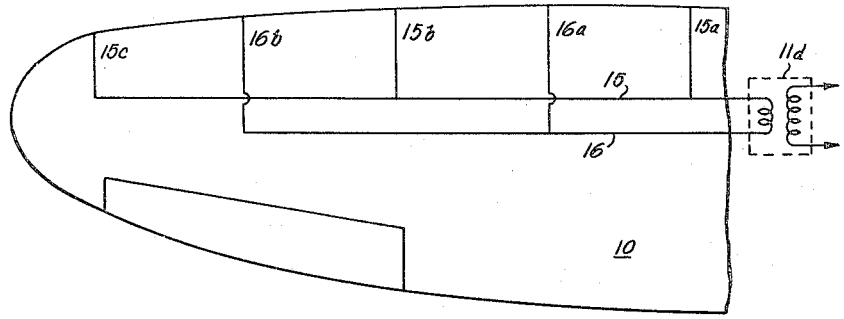
Figure 7 is a schematic diagram showing an alternative connection for a large airfoil surface and using only one transformer.

Figures 6 and 7 show an arrangement which may be used with large airfoil structures when it is desired to conserve power. Figure 6 shows an arrangement to heat wing 10 using a series of transformers 11a, 11b, 11c, while Figure 7 shows an arrangement utilizing a single transformer 11d. In Figure 6 the transformers 11a, 11b, 11c are disposed within the wing 10 at spaced intervals along its span and the primary windings of these transformers are connected to a power source through lines 13, 14. The low-resistance secondary leads 12a, 12b, 12c from the respective transformers 11a, 11b, 11c are connected to the metallic skin of the wing at the leading edge so as to include a section of the leading edge portion in the return circuit. The spacing of these leads will be determined by the rating of the transformer and enough transformers will be used to heat the entire leading edge, or as much of it as may be desired.

The single transformer 11d used in Figure 7 is preferably mounted in or near the fuselage of the aircraft since it is of larger size than those of Figure 6. The low-resistance secondary leads 15, 16 extend spanwise of the wing 10 and have low-resistance intermediate leads 15a, 15b, 15c and 16a, 16b, connecting them to the leading edge portion of the skin of the wing. These intermediate leads are connected alternately, i. e. one from lead 15 and one from lead 16, at spaced intervals along the length of the leading edge. Thus the leading edge of the wing 10 provides a series of paths in parallel to complete the secondary circuit of the transformer 11d. The number of intermediate leads will be determined by the length of leading edge that is to be heated.

In the arrangements shown in Figures 6 and 7, heating current is circulated through other areas of the wing skin but the current density is greatest in the area forming the leading edge of the wing and, accordingly, the heating is greatest in this zone. In both these arrangements current is passed through different linear sections of the leading edge of the wing skin by means of branch connections from a common current supply circuit.

The passage of the current through the thin sheath forming the outer surface of the airfoil structure in any of the modifications heats the sheath and prevents the formation of ice thereon. The generation of heat in the thin skin is due to the Joule effect of the current flowing through the internal resistance of the thin metal skin, whereby electric energy is converted into heat internally of the skin. Direct current may be used for this purpose, but it is preferred to use alternating current which can be generated and transformed with less difficulty than direct current. In using alternating current, it is preferred to use a frequency of 400 cycles per second or higher as this produces more effective and efficient heating than the use of the standard power frequency of 60 cycles per second. By using sufficiently high frequencies it would be possible to confine the heating to a thin surface skin regardless of the actual skin thickness.

We claim:

1. A monocoque airfoil structure formed of thin sheet metal, and in combination therewith means for utilizing said thin sheet metal as a heat radiating surface for preventing the formation of ice thereon, said means comprising a conducting member disposed internally of said structure and extending longitudinally thereof, said conducting member being electrically connected to said structure at the outer tip thereof and being insulated from said structure throughout the remainder of its length, and electrical terminal means for the sheet metal structure and for said conducting member located at points remote from said outer tip and connecting the inner end of said structure and said conducting member to an electric current source, whereby a path for current flow through the skin of said structure is established lengthwise of said structure.

2. An airfoil structure comprising a metallic core member extending from an inner point to an outer tip position, an insulating sheath surrounding said core member and a thin metallic sheath surrounding said insulating sheath to constitute an air reaction surface of said airfoil structure, and in combination therewith means to include said metallic core and said thin metallic sheath as electrical conductors in an electrical heating circuit including a source of electric current, said means comprising an electrically conducting element connecting said core and said sheath at said outer tip, and electrical terminals for said core and said thin metallic sheath positioned near said inner point and connected to said source of electric current, whereby the formation of ice on said air reaction surfaces may be prevented by the heat produced in said air reaction surface by said source of electric current.

3. An airfoil structure having an extended air reaction surface formed entirely of a continuous outer skin of electrically conducting, heat dissipating material, and in combination therewith means to include said electrically conducting skin as a heat generating electrical conductor in an electrical heating circuit for the removal of ice from said airfoil structure, said means comprising an insulated conducting member disposed internally of said skin and extending longitudinally thereof, said conducting member being conductively connected to said skin at the outer tip portion thereof, low-resistance means connecting the other end of said conducting member to one terminal of a source of current, and low-resistance means connecting the other terminal of said source of current to said skin at a point spaced remotely from said tip portion along the length of said airfoil structure, whereby said outer skin provides substantially all of the electrical resistance in said heating circuit and whereby current of substantial value flows through said skin lengthwise of said structure and generates substantial heat therein.

4. An airfoil structure according to claim 3 and including a second insulated conducting member disposed internally of said skin and extending longitudinally thereof, said insulated conducting members comprising a pair of electric supply conductors, a set of branch connections electrically connecting one of said supply conductors to said outer skin at a number of spaced stations distributed along the leading edge portion of said airfoil structure, and a second set of branch connections electrically connecting said second supply conductor to said outer skin along the leading edge portion thereof and at points located intermediate said spaced stations.

5. An airfoil structure comprising a hollow member having a thin metallic outer skin, a pair of electric terminals external to said hollow member connected to a source of electrical current, a plurality of transformers disposed within said hollow member in spaced relation along the span thereof, means connecting the primary terminals of each of said transformers to said electric terminals, and means for completing the secondary circuits of said transformers through a plurality of paths through the metallic outer skin forming the leading edge of said airfoil structure, said paths being completed through individual portions of said skin spaced along said leading edge.

6. An airfoil structure comprising a hollow member with a thin, metallic skin forming the outer surface thereof, and in combination therewith a pair of electric current supply conductors supported within said hollow member, a pair of branch electrical connections energized from said conductors and connected to a pair of points spaced along the portion of said skin forming the leading edge of said airfoil and a second pair of branch connections energized from said supply conductors and connected to a second pair of points on said leading edge portion, said second pair of points being spaced longitudinally of said edge portion with respect to said first pair of points, whereby said two pairs of branch connections supply heating current passing longitudinally through different linear sections of said leading edge portion and said current generates substantial heat in said leading edge portions.

References Cited in the file of this patent

UNITED STATES PATENTS

| Number | Name | Date |
| --- | --- | --- |
| 1,705,126 | Lee | Mar. 12, 1929 |
| 1,807,359 | Waters | May 26, 1931 |
| 1,819,497 | Chisholm | Aug. 18, 1931 |
| 1,868,468 | Thompson | July 19, 1932 |
| 2,205,543 | Rideau et al. | June 25, 1940 |
| 2,347,114 | Larson | Apr. 18, 1944 |
| 2,391,994 | McCollum | Jan. 1, 1946 |